United States Patent [19]

Zaruba et al.

[11] Patent Number: 4,595,099
[45] Date of Patent: Jun. 17, 1986

[54] SANDWICH PREPARATION AND STORAGE CONTAINER SET

[75] Inventors: John V. Zaruba, Chicago; Howard J. Morrison, Deerfield, both of Ill.; Rino Conti, Stoughton, Mass.

[73] Assignee: Marvin Glass & Associates, Chicago, Ill.

[21] Appl. No.: 697,284

[22] Filed: Feb. 1, 1985

[51] Int. Cl.⁴ .................. B65D 85/60; B65D 85/78
[52] U.S. Cl. .................. 206/525; 206/503; 206/508; 206/804; 99/450.5; 222/386; 220/4 D; 220/93; 229/DIG. 13
[58] Field of Search .......... 206/525, 526, 804, 37, 206/508, 503, 509; 229/DIG. 13; 220/4 D, 93; 222/386, 391, 393; 215/10; 99/450.5

[56] References Cited

U.S. PATENT DOCUMENTS

| | | | |
|---|---|---|---|
| 2,364,916 | 12/1944 | Rasmussen | 206/804 |
| 2,990,054 | 6/1961 | Gellman | 206/37 R |
| 3,070,224 | 12/1962 | Robinson et al. | 206/525 |
| 3,273,739 | 9/1966 | Tohchung Wei | 220/4 D |
| 3,432,027 | 3/1969 | Mueller | 206/804 |
| 3,481,458 | 12/1969 | Mayeaux | 220/93 |

Primary Examiner—William Price
Assistant Examiner—Brenda J. Ehrhardt
Attorney, Agent, or Firm—John S. Pacocha

[57] ABSTRACT

An ice cream sandwich preparation and storage container set with open top shells having partial bottom walls defining a central aperture. Substantially conforming with the bottom of the shell is an insert disk that effectively seals the aperture while forming a base for the ice cream and cookie sandwich. The bottom periphery of the shell is formed with a flange that fits over the upper rim of another similar container so that the bottom of one container may act as the sealing cover for an underlying container. When it is desired to consume one of the previously prepared and stored sandwiches it may be easily extracted from the container by, after removing the cover, pushing up on the insert disk through the aperture with a thumb or forefinger.

12 Claims, 5 Drawing Figures

SANDWICH PREPARATION AND STORAGE CONTAINER SET

BACKGROUND OF THE INVENTION

1. Field of the Invention

This invention relates generally to food preparation and storage and more particularly to a container facilitating the making of sandwiches, such as those made from cookies and ice cream, as well as the organized storing of the sandwiches.

2. Background Art

Storage containers for hermetically sealing food are old in the art. U.S. Pat. No. 3,837,775 discloses containers that with the cooperation of a mold and press facilitates the forming of food patties that are then stored in individual sealed containers stacked one upon the other. The sidewalls of the container diverge upwardly and outwardly while the mold has substantially straight cylindrical sides. After the food patty is formed and the cylindrical mold removed, the food patty is out of contact with the container sidewall to facilitate removal of the food patty at a later time. There remains, however, a need for a hermetically sealable container that facilitates the formation and storage, as well as later removal for consumption of food products such as cookie and ice cream sandwiches.

SUMMARY OF THE INVENTION

The present invention is concerned with providing a hermetically sealable container that not only facilitates the formation and storage of a food product such as a cookie and ice cream sandwich, but also facilitates removal for later consumption. These and other objects and advantages of the invention are achieved by providing a sandwich preparation and storage container set with a central shell defining an interior having an open top and an inwardly extending partial bottom wall forming a generally centrally disposed aperture. A cover seals the open top and an insert that substantially conforms to the interior opening and the bottom wall seals the aperture and provides an unobstructed base for the sandwich which may be pushed up and out of the container by the user's thumb or finger. Each shell may be stacked in sealing engagement atop another shell Alternatively, the shells may be arranged side by side by a retaining ring and all sealed with a single large cover.

BRIEF DESCRIPTION OF THE DRAWING

For a better understanding of the present invention reference may be had to the accompanying drawing in which.

DETAILED DESCRIPTION OF THE PREFERRED EMBODIMENT

Figure 1:
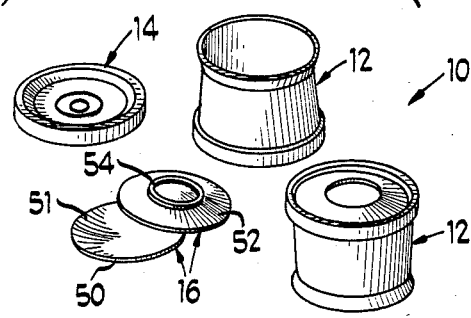
FIG. 1 is a perspective view of components of an embodiment of the present invention.
Figure 2:
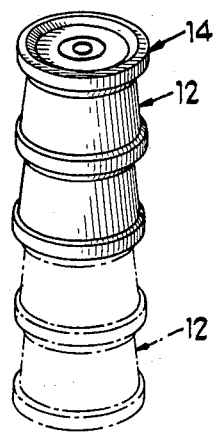
FIG. 2 is a perspective view of the components shown in FIG. 1 assembled in a stacked storage relationship.

Referring now to the drawing in which like parts are designated by like reference numerals throughout the several views, there is shown in FIG. 1 a sandwich preparation and storage container set 10 which includes a shell 12, lid 14 and insert disks 16. One of the shells 12 is shown right side up while another shell 12 is shown inverted. Similarly, the bottom face of one and the top face of another of the insert disks is also shown.

Shell 12 is a hollow, with a solid, generally cylindrical, sidewall 20. The interior of the shell is provided with a slight draft of the magnitude of two to three degrees so that the inside diameter of the opening increases slightly from the bottom to the top. Although the draft does make removal or extraction of the completed sandwich a little more facile, the main purpose of the draft is to facilitate manufacture of the shell. Along the top, cylindrical wall 20 is flared out slightly to define an upper rim 21.

Figure 3:
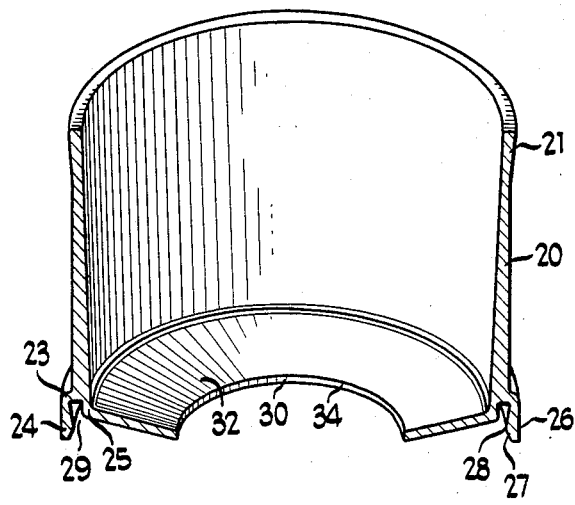
FIG. 3 is an enlarged scale, perspective view of the shell in vertical section.
Figure 4:
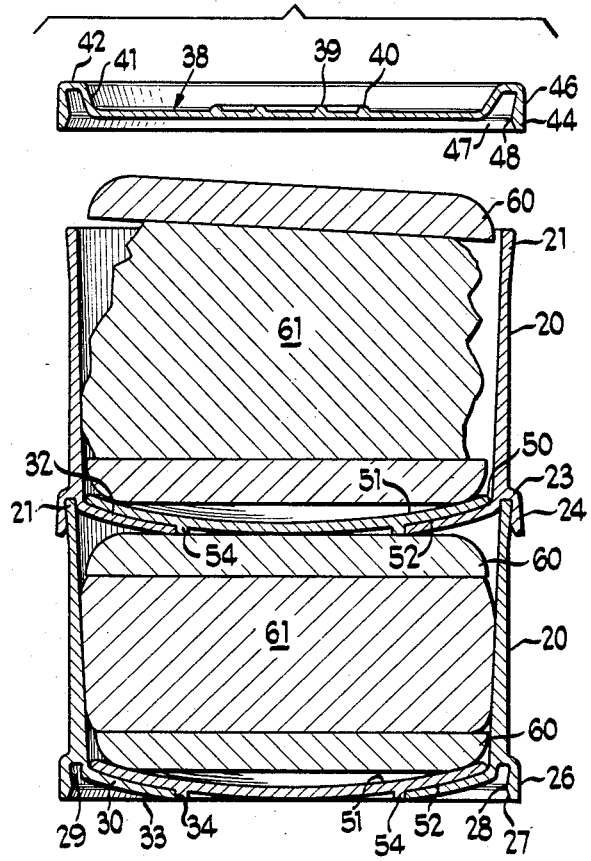
FIG. 4 is an enlarged scale, vertical section of two of the containers in stacked relationship showing both the sandwich preparation and sandwich storage stages.

At the bottom, sidewall 20 projects out laterally a short distance to form a shoulder 23 and then extends downwardly forming a flange 24 generally parallel to the main part of sidewall 20 that continues below shoulder 23 to form a short extension 25. As is shown in FIGS. 3 and 4 flange 24 has a substantially straight outer surface 26 while the inside surface 27 is formed with an inwardly directed ridge 28. Between flange 24 and extension 25, a sealing groove 29 is defined.

After extension 25, shell 12 has an integrally formed, inwardly extending, curved bottom wall or ledge 30. From the interior of shell 12 the partial bottom wall 30 has a concave inner face 32 and an outer convex face 33. A generally central aperture 34 is formed by the partial bottom wall. While the exact size of the aperture is not critical, it should be sufficiently large to easily permit the insertion of a user's thumb or finger. For a shell having a diameter of two and three-quarters to three inches, an aperture of a diameter of approximately one and one-half inches is large enough to accommodate an adult user's digit, and still leave a sufficient partial bottom wall 30.

Lid 14 is formed with a generally planar central portion 38 that has a pair of upwardly projecting concentric annular ribs 39 and 40. From around the outside edge of the central portion there is an upwardly and outwardly slanting wall 41 extending laterally outwardly to form an annular, generally flat, top wall 42. Projecting down from the outside of the annular wall 42 is a flange 44 having a generally straight outside surface 46 and an inside surface 47 that angles inwardly and then outwardly again to form an inwardly extending ridge 48. Flange 46 on lid 14 is similar to the bottom peripheral flange 24 of shell 12 and functions in the same manner to grip the upper rim 21 surrounding the open top of a container 20 and effect a hermetic seal.

Insert disk 16 has a generally circular periphery 50 which is about the same size as the opening of shell 12 so that disk 16 fits relatively tightly in the shell. Disk 16 has an upper generally concave, unobstructed, face 51 and a bottom generally convex face 52 that conforms to the concave contour of the inner face 32 of the partial bottom wall of the shell. The bottom face of the disk has a downwardly projecting annular rib 54 the outside diameter of which closely conforms to the diameter of aperture 34 in the bottom wall of the shell.

Shell 12 is made of a resilient material that is rigid enough to be self-supporting. Disk 16 is preferably made of a more rigid material than the shell. The dimensions and relative tolerances are such that some force is required to properly seat the disk thus better insuring a seal of the bottom aperture 34 in the shell. With disk 16 properly seated in the bottom of a shell 12, and the shell stacked atop another shell, or more particularly the groove 29 of the upper shell engaging the upper rim 21 of the lower shell, a nested or stacked arrangement results wherein the one shell seals the shell beneath it. Lid 14 is applied to cover the open top of the uppermost shell.

As is illustrated in FIG. 4, the present invention is particularly well suited for facilitating the preparation of a desert comprising a sandwich made of cookies 60, chocolate chip cookies being a particular favorite, with a center filling of ice cream 61. The unobstructed inner face 51 of the inserted disk supports a bottom cookie, a scoop of ice cream is then dropped into the container and another cookie is then pushed down on top of the ice cream. A number of such sandwiches may be made, each in its own individual container and then stacked one on top of the other for storage. During the making of each sandwich the ice cream, and possibly the cookies, come into contact with the interior of the sidewall of the shell. Nevertheless, the bottom insert disk is sufficiently rigid, and is further strengthened by its curved shape and bottom annular rib, to permit the user to push the completed sandwich up and out of the container.

Figure 5:
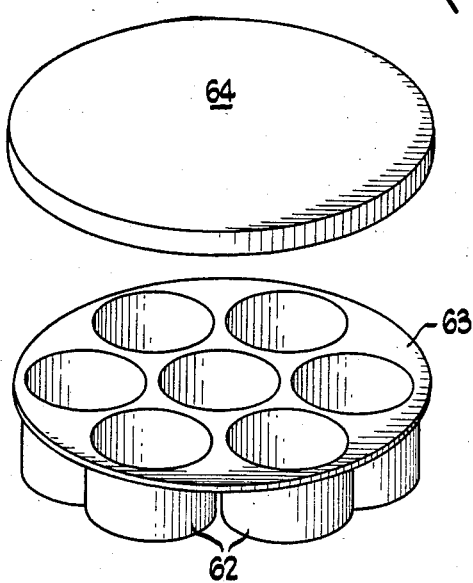
FIG. 5 is a perspective view of an alternative embodiment.

In an alternative embodiment shown in FIG. 5, individual shells 62 are retained in a side by side, planetary, arrangement by a ring 63. Shells 62 are similar to shells 12 but without the lower shoulder 23 and flange 24. A bottom disk insert 16 is provided for each of the shells and a single cover 64, similar to, but larger than lid 14 is sealed about the periphery of ring 63.

While particular embodiments of the present invention have been shown and described, further changes and modifications will occur to those skilled in the art. It is intended in the appended claims to cover all such changes and modifications as fall within the true spirit and scope of the present invention.

What is claimed as new and desired to be secured by Letters Patent is:

1. A sandwich preparation and storage container set comprising:
   an open top shell of a first material and having a predetermined height with an interior opening of a predetermined size;
   an upper rim on the shell surrounding the open top;
   a partial bottom wall extending inwardly from the shell forming an inner face of a predetermined contour and a generally centrally disposed aperture;
   cover means engagable with the upper rim to substantially seal the open top; and
   an insert of a second material more rigid than the first material and having a periphery that substantially conforms with the opening of the hollow member, a substantially continuous, unobstructed top face, and a bottom face with a contour that substantially conforms with the contour of the inside face of the bottom wall of the shell to seal the aperture.

2. The container set of claim 1 including means defining a groove along the bottom of the shell engagable with the upper rim of another substantially similar shell so that the shell functions as the cover means to substantially seal the open top of the other container.

3. The container set of claim 1 in which the inner face of the partial bottom wall of the shell is concave and the bottom face of the insert is convex.

4. The container set of claim 3 in which the insert is of substantially uniform cross section and the bottom face of the insert has a downward projection that substantially conforms to the centrally disposed aperture in the partial bottom wall.

5. The container set of claim 4 in which the projection is an annular rib.

6. The container set of claim 1 in which the shell opening is generally cylindrical.

7. The container set of claim 6 in which the diameter of the opening is greater than the predetermined height.

8. A sandwich preparation and storage container set comprising:
   an open top shell of a predetermined height with an interior opening of a predetermined size;
   an upper rim on the shell surrounding the open top;
   a partial bottom wall extending inwardly from the shell forming an inner face of a predetermined concave contour and a generally centrally disposed aperture;
   cover means engagable with the upper rim to substantially seal the open top;
   an insert of substantially uniform cross section having a periphery that substantially conforms with the opening of the hollow member, a substantially continuous, unobstructed top face, and a bottom face with a convex contour that substantially conforms with the contour of the inside face of the bottom wall of the shell to seal the aperture; and
   the bottom face of the insert having a downwardly projecting annular rib that substantially conforms to the centrally disposed aperture in the partial bottom wall.

9. The container set of claim 8 including means defining a groove along the bottom of the shell engagable with the upper rim of another substantially similar shell so that the shell functions as the cover means to substantially seal the open top of the other container.

10. The container set of claim 8 in which the shell opening is generally cylindrical.

11. The container set of claim 10 in which the diameter of the opening is greater than the predetermined height.

12. The container set of claim 8 in which the insert is made of a more rigid material than the shell.

* * * * *